L. S. McCLAVE.
SPRING BICYCLE FRAME.
APPLICATION FILED FEB. 8, 1911.
1,014,888.
Patented Jan. 16, 1912.
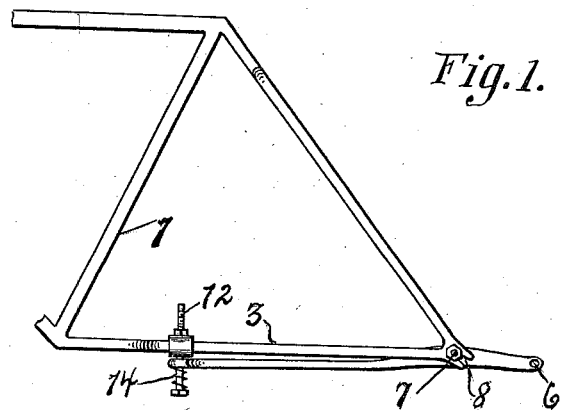
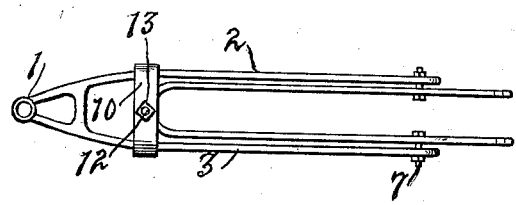
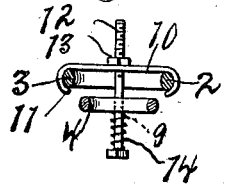
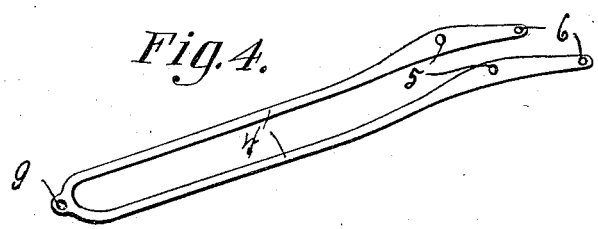
Lee S. McClave,
INVENTOR
WITNESSES

UNITED STATES PATENT OFFICE.

LEE S. McCLAVE, OF PEABODY, KANSAS.

SPRING BICYCLE-FRAME.

1,014,888.     Specification of Letters Patent.     Patented Jan. 16, 1912.

Application filed February 8, 1911. Serial No. 607,396.

*To all whom it may concern:*

Be it known that I, LEE S. McCLAVE, a citizen of the United States, residing at Peabody, in the county of Marion and State of Kansas, have invented new and useful Improvements in Spring Bicycle-Frames, of which the following is a specification.

My invention relates to spring frames for bicycles, and more particularly to an auxiliary rear fork adapted to be resiliently mounted upon a bicycle frame of usual construction, in order to render the device easier ridden.

An object of my invention is to provide spring means of the above nature which may be easily and quickly applied by anyone unskilled in the art to a bicycle frame such as those now in use, and which will prevent absolutely the jar incident to riding solid tired wheels over rough and rocky roads.

Another object of my invention is to provide a device of this nature which may be applied to bicycles now in use, and thus do away with pneumatic tires whereby tire expense is lowered and the possibility of punctures entirely obviated.

With the foregoing and other objects in view, my invention consists in such details of construction and in the arrangement and combination of parts as will be hereinafter more fully described and specifically pointed out in the appended claims.

In describing my invention in detail reference will be had to the accompanying drawings wherein like characters denote like or corresponding parts throughout the several views and, in which:—

Figure 1 is a view in side elevation of a bicycle frame embodying my improvements. Fig. 2 is a plan view of the lower rear forks. Fig. 3 is a vertical cross section showing in detail the means I employ for holding one end of my auxiliary fork, and Fig. 4 is a perspective view of my auxiliary fork.

In carrying my invention into practice an ordinary bicycle frame 1 of usual construction is employed, this frame of course having the well known fork construction comprising the lower bars 2 and 3 respectively. An auxiliary fork 4 made of a single piece of tubing doubled upon itself and having its opposite ends slightly flattened and provided with holes 5 and 6, is connected to said forks by means of bolts 7 which are adapted to be received within the bifurcated ends 8 of said fork. Said bolts 7 pass through the apertures 5 in the auxiliary forks, and are tightened and held in place by means of nuts 8, in a manner which will be readily understood. Said auxiliary fork is approximately of the same length as the fork comprised by the arms 2 and 3, but is of less width so as to be received within the arms of said fork, as will be seen upon reference to Fig. 2. It will be seen also that said auxiliary fork extends some distance in rear of the terminus of the usual fork, the apertures 6 being provided in order to receive the axle of the wheel in the usual manner.

The forward end of the auxiliary fork is provided with an aperture or eye 9, the purpose of which will be hereafter more fully understood.

Adapted to be disposed on the main fork immediately above the forward end of the auxiliary fork is the clip or clamping plate 10, having its ends 11 curved inwardly so as to embrace the sides of the fork. This clamping plate is made of such size as to become tightly wedged over the fork by moving it rearwardly. By moving it in a forward direction it may be easily disengaged from the frame as will be seen upon reference to Fig. 2, for the fork is of course narrower toward the front than it is farther back. This plate is provided with an aperture adapted to register with the aperture or eye in the forward end of the auxiliary fork. Passed through this aperture and the eye 9 is a bolt 12, having a screw threaded end upon which is received a nut 13 by means of which the length of the bolt that depends below the plate 10 can be regulated. Disposed on said bolt between its head and the fork 4 is a spring 14 in order to take up and compensate for the movement of said fork.

It will be seen that any forward movement of the wheel caused by an unevenness in the road or the like will cause the outer end of the auxiliary fork to move upward and the inner end in the opposite direction or downward. This movement is however arrested by the spring 14 all shock and jar being thus taken up.

I desire it to be understood that slight changes in the construction and in the arrangement and combination of parts above set forth may be resorted to without departing from the spirit of my invention, provided such changes fall within the scope of the appended claims.

Having thus fully described my invention what I claim as new and desire to secure by Letters Patent, is:—

1. The combination with a bicycle frame, of an auxiliary fork adapted to be pivotally connected to the rear ends thereof, the rear ends of said fork adapted to receive a wheel, a plate on said frame, a bolt adjustably mounted in said plate and depending therefrom, the forward end of said fork being slidably mounted upon said bolt, and a spring interposed between said fork and the head of said bolt.

2. In a device of the character described, the combination with a bicycle frame, of an auxiliary fork adapted to be connected to said frame, one end of said fork adapted to receive a wheel, the other end of said fork having a perforation therein, a plate on said frame having a perforation therein, a bolt passed through both of said perforations, a spring on said bolt between the head thereof and said fork, and means for regulating the tension of said spring.

3. In a device of the character described, the combination with a bicycle frame, of forks adapted to be connected to the rear end thereof, a plate adapted to pass over the lower opposite bars of said frame at the constricted portion thereof, said plate adapted to be wedged tight by moving it over the diverging portions of said bars, a bolt depending from said plate, and means whereby the forward end of said fork is resiliently mounted on said bolt.

4. In a device of the character described, the combination with a bicycle frame, of forks adapted to be connected to the rear end thereof, a plate having inwardly curved ends, said plate being adapted to pass over the lower opposite bars of said frame at the constricted portion thereof, and to be wedged tight by moving it over the diverging portions of said bars, said plate having an aperture therein, a screw threaded bolt passed through said aperture, said forks being connected to said bolt, a spring resiliently supporting said forks, and means for regulating the tension of said spring.

LEE S. McCLAVE.

Witnesses:
H. W. GRAVIS,
B. F. VAIL.

Copies of this patent may be obtained for five cents each, by addressing the "Commissioner of Patents, Washington, D. C."